United States Patent [19]

Vandenengel

[11] Patent Number: 5,633,490

[45] Date of Patent: May 27, 1997

[54] CARD READER WITH SPRING CONTACTS

[75] Inventor: Gerald W. Vandenengel, Grafton, Mass.

[73] Assignee: Oki Electric Industry Co., Ltd., Tokyo, Japan

[21] Appl. No.: 418,197

[22] Filed: Apr. 7, 1995

Related U.S. Application Data

[63] Continuation-in-part of Ser. No. 342,467, Nov. 21, 1994, Pat. No. 5,517,011.

[51] Int. Cl.$^6$ .................................................. G06K 19/06
[52] U.S. Cl. ........................ 235/492; 235/441; 235/487
[58] Field of Search .................................... 235/487, 441, 235/492

[56] References Cited

U.S. PATENT DOCUMENTS

| | | |
|---|---|---|
| 4,100,856 | 7/1978 | Ziemba ................................ 235/441 |
| 4,379,966 | 4/1983 | Flies ................................... 235/443 |
| 4,404,464 | 9/1983 | Moreno . | |
| 4,489,615 | 12/1984 | Mollet ................................ 235/441 |
| 5,231,274 | 7/1993 | Reynier .............................. 235/441 |

*Primary Examiner*—Harold Pitts
*Attorney, Agent, or Firm*—Morgan & Finnegan LLP

[57] ABSTRACT

A card reader comprising a housing having a contact surface with a plurality of apertures. A reader circuit is contained within the housing, the reader circuit having a plurality of contact pads, and a plurality of electrical contacts positioned in the housing and at least partially extending into the apertures, wherein each electrical contact comprises a conductive torsion spring that slidably engages one of the contact pads.

11 Claims, 4 Drawing Sheets

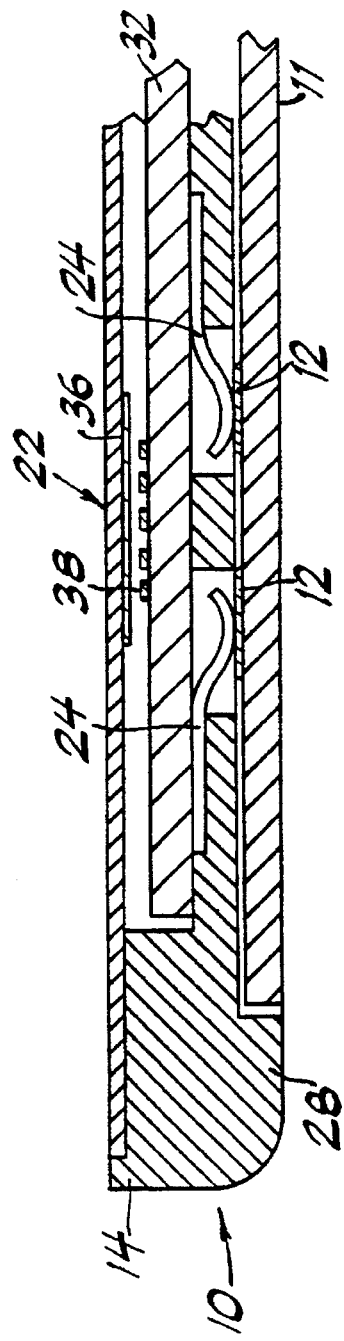
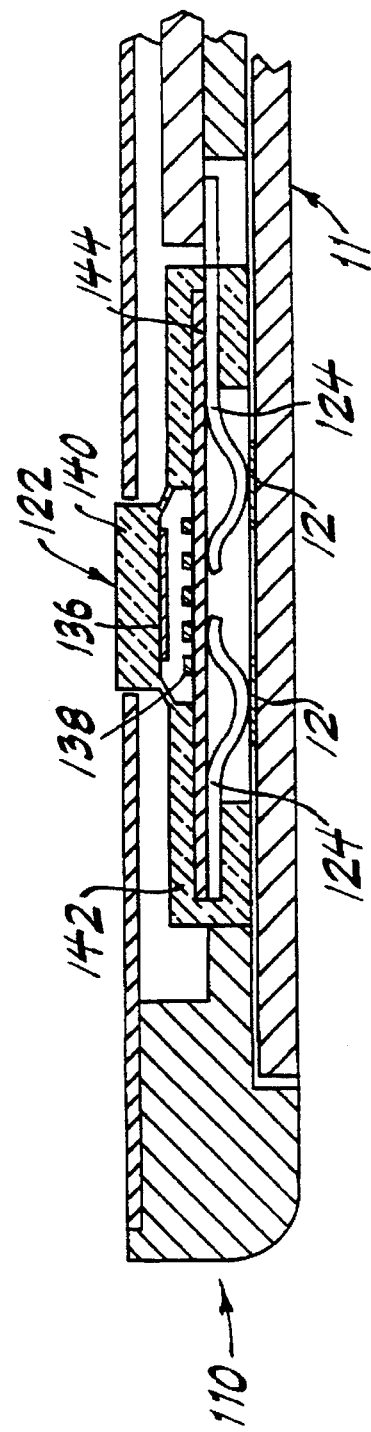
FIG. 3
FIG. 4

CARD READER WITH SPRING CONTACTS

REFERENCE TO RELATED APPLICATION

This is a continuation-in-part of 08/342,467, Nov. 21, 1994, U.S. Pat. No. 5,077,011, May, 14, 1996.

FIELD OF THE INVENTION

This invention relates to readers for smart cards and, in particular, to a contact used to make an electrical connection between such a card and a reader used to read and/or write information on the smart card.

BACKGROUND OF THE INVENTION

Smart cards have become widespread as the uses for such cards multiplies. Subway riders can now purchase a card with a desired value programmed into the card, with the stored value decreasing by an amount equal to the fare each time the user uses the card to gain access to the subway system. Similar cards are used in vending machines, allowing users to carry one card to use for all their vending purchases instead of needing change or single dollars. The programmed amount on the card is reduced each time a purchase is made. Prepaid telephone smart cards are also popular.

Furthermore, smart cards that do not store cash information can also be used. For example, drivers licenses can store personal or medical data, etc.

One disadvantage with smart cards is that the user of the card has no easy way of determining the data that is stored on the card unless he or she remembers it. If the user forgets, then he or she must normally go to a machine that accepts such cards to find out what is stored on the card (e.g., the amount of money that is left on the card.)

Portable card readers have been developed to allow a user to more easily determine the remaining value on all the cards in his or her possession. Such a reader, for example, is shown in U.S. Pat. No. 5,015,830 to Masuzawa et al. and features a reader having a slot into which the card is inserted, electronic reading circuits for reading the information stored on the card and a display for displaying the read information to the user. Another such card reader is shown in U.S. Pat. No. 5,272,319 to Rey.

Although the Masuzawa and Rey devices are small enough to be portable, they are, nevertheless, too large for many users to carry around with them on a regular basis. The complex nature of such devices can also make their cost prohibitive.

SUMMARY OF THE INVENTION

The disadvantages of the prior art have been overcome by the present invention, which features a card reader that includes an improved contact for forming an electrical connection between the reader and a card to be read.

In one aspect, the invention features a card reader for reading information stored on a card, the reader comprising: a housing having a contact surface, the contact surface having a plurality of apertures; a reader circuit contained within the housing, the reader circuit having a plurality of contact pads; and a plurality of electrical contacts positioned in the housing and at least partially extending into the apertures; wherein each of the electrical contacts comprises a conductive element that slidably engages one of the contact pads.

In the preferred embodiment, the reader further comprises a display on the housing and connected to the reader circuit.

The electrical contact can comprise a torsion spring. More generally, each electrical contact preferably comprises a continuous conductive element having two linear portions joined by a coiled portion, the two linear portions forming an acute angle therebetween when the contact is in an uncompressed state, and wherein the linear portions are movable to be substantially coplanar to thereby place the contact in a compressed state.

Each of the electrical contacts preferably protrudes from one of the apertures such that when a smart card is placed against the contacts, the contacts form an electrical connection between the smart card and the reader circuit.

The contact surface further comprises guides protruding from the contact surface to guide the card to position contacts on a surface of the card against the contacts on the contact surface. The card reader preferably includes no rigid surface that is located below the contact surface.

The card reader further comprises a switch on an upper surface of the reader, the reader being activated by placing the reader over a smart card and squeezing the reader and the smart card together.

The card reader of the invention includes significant advantages over prior art card readers, including reduced manufacturing cost, reduced size, and other advantages that will be apparent to those of skill in the art from the following detailed description of the preferred embodiments.

BRIEF DESCRIPTION OF THE DRAWINGS

FIG. 3 is a cross-sectional side view of the reader ad smart card of FIGS. 1 and 2 with the card contacting the reader.

FIG. 4 is a cross-sectional side view of a second embodiment of the present invention.

DETAILED DESCRIPTION OF A PREFERRED EMBODIMENT

Various preferred embodiments of the card reader of the invention are described below, with the improved electrical contact feature described in connection with the embodiment of FIGS. 6–7.

Figure 1:
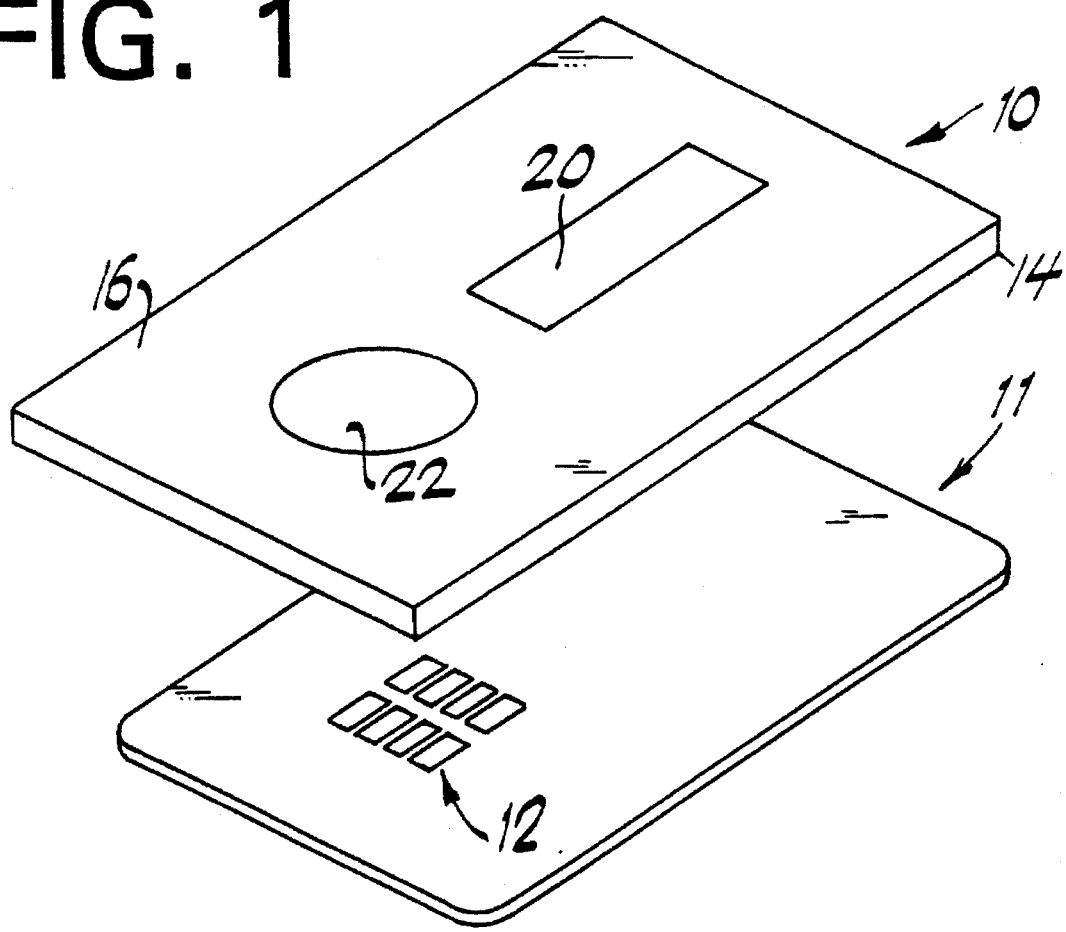
FIG. 1 is a perspective overhead view of a slotless reader of a first embodiment of the inversion positioned over a smart card.

Referring first to FIG. 1, a smart card reader 10 is shown positioned above and spaced from a smart card 11. The smart card 11 is any standard smart card that stores information and includes a plurality of contact pads 12 which are used by the reader to access the stored information. Reader 10 includes a housing 14, having an upper surface 16 and a lower surface 18 (see FIG. 2). A display 20 and a switch 22 are positioned on upper surface 16.

Figure 2:
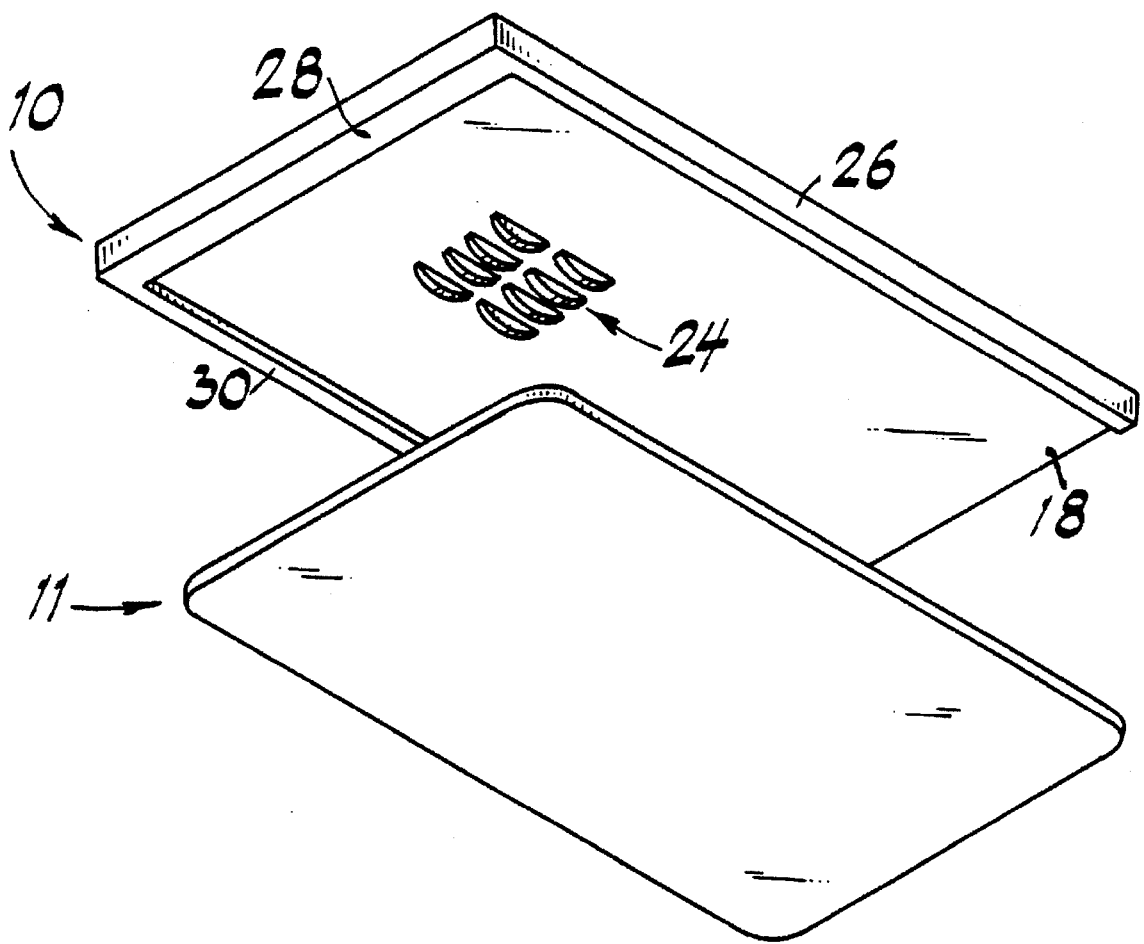
FIG. 2 is a perspective bottom view of the reader and smart card of FIG. 1.

Bottom surface 18 of reader 10 is shown in FIG. 2 and includes electrical contacts 24 that correspond to the contacts on smart card 11, as explained further below. Contacts 24 normally protrude slightly from bottom surface 18.

Bottom surface 18 also has guides 26, 28, 30 that protrude from surface 18 at the edges thereof to guide card 11 when it is placed against bottom surface 18 of reader 10.

FIG. 3 illustrates the placement of reader 10 against smart card 11 such that contacts 24 on reader 10 touch contacts 12 on smart card 11. Guides 26, 28 and 30 help to position card 11 such that a good contact is made between the respective electrical contacts 12, 24. Note that contacts 24, which are normally biased to protrude slightly away from surface 18 are pressed back forward surface 18 and into housing 14 when smart card 11 is pressed against reader 10.

The inside of housing 14 of reader 10 includes a circuit board 32 containing standard circuitry for reading information stored on smart card 11 via the electrical connection established by contacts 12, 24. The reader is activated by pressing down on switch 22 to bring a conductive pad 36 of switch 22 into contact with a conductive grid 38. Note that this type of switch is well known to those skilled in the art.

To use the reader, the user simply places the smart card against the reader and squeezes the card and reader together by, e.g., placing his thumb over switch 22 and his index finger on the bottom of smart card 11. As the user squeezes, switch 22 will be activated to deliver power to circuit board 32 from a suitable power source (not shown). Information stored on the smart card is read and displayed on display 20 (see FIG. 1).

Referring to FIG. 4, an alternative embodiment of the invention is shown in cross-section and features a reader 110 having a switch 122 that, when depressed, causes contacts 124 to be pressed more firmly against contacts 12 on smart card 11. Specifically, switch 122 includes an upper movable pad 140 that is connected to a membrane 142. A second membrane 144 is connected to the bottom of membrane 142, with a conductive grid 138 on the upper surface of membrane 144. A conductive pad 136 is on the bottom surface of pad 140.

When pad 140 is squeezed by a user to push it downward in FIG. 4, conductive pad 136 will contact conductive grid 138 to activate a circuit board 132 as in the embodiment of FIGS. 1-3. However, squeezing on pad 140 will also cause membranes 142, 144 to be deflected downward, which will cause contacts 124 to be more firmly pressed against the corresponding contacts 12 on smart card 11. When the reader is not in use, the contacts 124 need not protrude from the reader.

Figure 5:
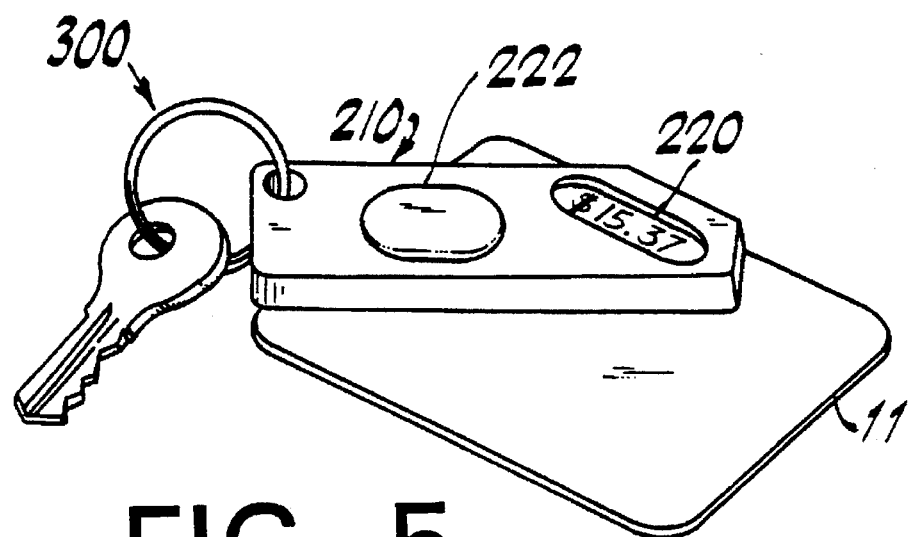
FIG. 5 is a perspective view of a third embodiment of the invention.

The invention can take many shapes, and is not limited to the rectangular embodiments described above. For example, FIG. 5 illustrates another embodiment of the invention, with a reader 210 placed over smart card 11 to display the information on smart card 11 on a display 220. A switch 222 activates the reader.

The FIG. 5 embodiment is even smaller than previous embodiments and is here shown attached to a key chain 300. (This is sometimes referred to as a key chain "FOB".)

The above description is illustrative of the invention only and other embodiments within the scope and spirit of the appended claims. For example, a number of different types of switches may be used with the invention, including a "snap action" membrane switch, which uses a stainless steel or spring metal disc that "snap" when pressed to give a tactile feel. In such a switch, the steel spring disc is pressed against a grid pattern on a circuit, shorting the pads, which then completes the circuit (similar to the simple membrane switch shown if FIGS. 3-4).

Other types of switches that could be used include a rubber tactile switch, where a rubber or similar material is molded into a key shape which is loosely attached to a thin rubber "skirt." When pressed, the key can move in relation to the skirt. A conductive pad is located on the underside of the key, and this pad shorts a grid pattern when the key is pressed, similar to the switches discussed above.

The switch can also be located on the bottom side of the reader, so that when the smart card and the reader are pressed together, the smart card itself activates the switch, instead of the thumb activating the switch. A switch can also be used that combines the contacts and switch function into the same device. In other words, the movement of the contacts into the housing of the reader when the smart card is pressed against the reader can activate the switch.

The reader of the invention may include some type of plastic cover, including a cover that extends away from the bottom surface of the reader to, in effect create a soft slot for placement of the smart card. This type of slot, of course, is not a traditional slot in that it will not have a rigid bottom, and is not necessary for reader function. It will merely serve to provide an extra measure of protection for the reader contacts. When not in use such a plastic cover would collapse toward the reader, thereby taking up little space. It could also be removed from the reader by the user for cleaning.

Figure 6:
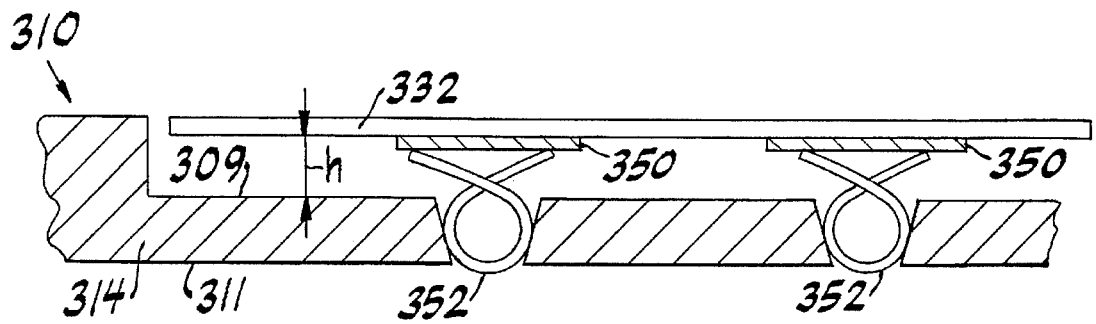
FIG. 6 is a cross-sectional view of a fourth embodiment of the invention that features an improved electrical contact.
Figure 7:
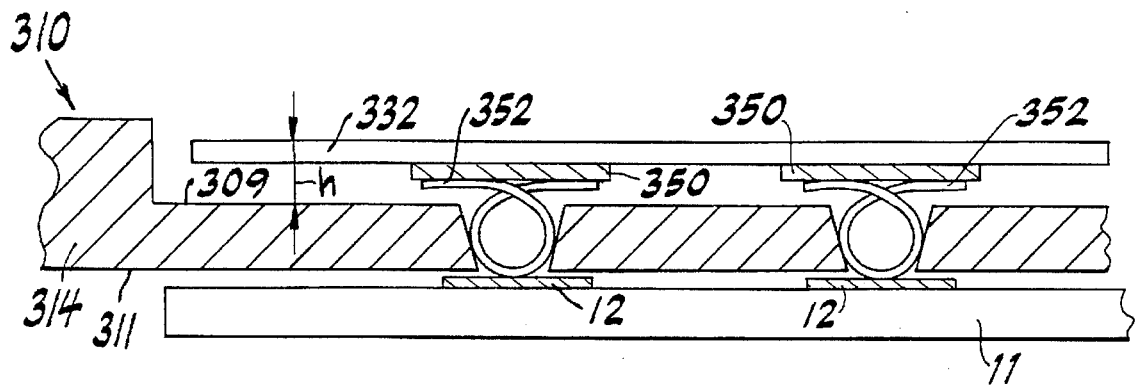
FIG. 7 is a cross-sectional view of the embodiment of FIG. 6 placed in contact with a smart card.
Figure 8:
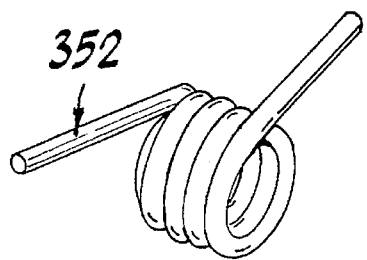
FIG. 8 is a perspective view of a torsion spring used in the embodiment of FIG. 6.

FIGS. 6-8 illustrate an alternative embodiment of the invention that features an improved spring contact that further simplifies manufacture of the reader and makes the reader even more compact.

Referring to FIG. 6, a portion of a reader 310 is shown (the remaining portions can be similar to those shown in any of the above described embodiments). Reader 310 includes housing 314 in which is enclosed a circuit board 332. Circuit board 332 has a plurality of electrical contact pads 350, preferably including eight gold plated pads (two of which are shown).

A torsion spring 352 is positioned beneath each contact pad 350, and extends into an opening or aperture in housing 314 (e.g., similar to the openings through which contacts 24 protrude in the FIG. 2 embodiment described above). A distance h is defined as the distance between circuit board 332 and the inner surface 309 of housing 314. A contact surface 311 is opposite surface 309.

In the uncompressed state of the springs, as shown in FIG. 6, the longitudinal portions of each spring form an acute angle, and bias circuit board 332 away from the surfaces 309, 311. The coiled portions of each spring extend into the openings in housing 314.

When smart card 11, having electrical contacts 12 is positioned against contact surface 311, as shown in FIG. 7, each contact 11 forms an electrical connection with a corresponding spring 352. A downward pressure is applied to circuit board 352 to reduce distance h, thereby compressing springs 352. As springs 352 compress, the longitudinal portions of each spring become substantially coplanar, and a sufficient electrical connection is formed between each contact pad 350 and its corresponding spring 352 to transmit data between smart card 11 and circuit board 332. (Note that in the uncompressed state, as shown in FIG. 6, there need be no contact between the springs 352 and the pads 350.)

The downward pressure on circuit board 332 is preferably supplied by the user squeezing the reader 310 together with the smart card 11. This pressure can be supplied, for example, using the structure shown in FIGS. 3 and 4, and described above.

One of the torsion springs 352 is shown in more detail in FIG. 8, and comprises a coiled metal structure that is simple to manufacture and install.

The improved spring contacts of the invention, while illustrated in the context of the slotless card reader of the preferred embodiment, is not limited thereto. This improved contact finds utility in many applications, including more traditional readers having rigid slots for insertion of the smart card.

The torsion spring 352 has numerous advantages over prior art contacts, including the elimination of the need for soldering the contact to the device (the spring tension keeps the contact in place), and the ability to directly insert the contacts into the housing or case for the reader without requiring a separate structure to support the contacts. This simplified assembly reduces manufacturing costs. Furthermore, the spring contact requires less space than traditional contacts, thus allowing the device to be even more compact.

Other modifications to the present invention are within the spirit and scope of the appended claims.

I claim:

1. A card reader for reading information stored on a card, said reader comprising:

a housing having a contact surface, said contact surface having a plurality of apertures;

a reader circuit contained within said housing, said reader circuit having a plurality of contact pads; and a plurality of electrical contacts positioned in said housing and at least partially extending into said apertures;

wherein each said electrical contact comprises a torsion spring having a conductive element that slidably engages one of said contact pads; and wherein each said torsion spring comprises a continuous conductive element having two linear portions joined by a coiled portion, said two linear portions forming an acute angle therebetween when said contact is in an uncompressed state.

2. A card reader according to claim 1 further comprising a display on said housing and connected to said reader circuit.

3. A card reader according to claim 1 wherein said linear portions are movable to be substantially coplanar to thereby place said contact in a compressed state.

4. The card reader of claim 3 wherein said coiled portion of each of said torsion springs extends into one of said apertures, and wherein said linear portions contact one of said pads.

5. The card reader of claim 1 wherein each of said torsion springs protrudes from one of said apertures, and wherein when a smart card is placed against said contacts, said contacts form an electrical connection between said smart card and said reader circuit.

6. The card reader of claim 1 wherein said contact surface further comprises guides protruding from said contact surface to guide said card to position contacts on a surface of said card against said contacts on said contact surface.

7. The card reader of claim 1 wherein said reader includes no rigid surface that is located below said contact surface.

8. The card reader of claim 1 further comprising a switch on an upper surface of said reader and wherein said reader is activated by placing said reader over a smart card and squeezing said reader and said smart card together.

9. The card reader of claim 1 wherein said reader circuit is movable toward and away from said contact surface.

10. The card reader of claim 9 wherein each said electrical contact biases said reader circuit away from said contact surface.

11. The card reader of claim 1 further comprising a writing circuit for writing information onto a smart card.

* * * * *